April 2, 1968  V. B. CRESS, JR., ET AL  3,376,546
TRAFFIC CONTROL SYSTEM
Filed June 28, 1965

INVENTORS
VERNOR B. CRESS, JR.
EUGENE P. HOYT
PETER F. APITZ
RAMEY B. METZ
ROBERT D. POLLOCK
STANLEY M. KERBER
RAY W. CABE
BY
ATTORNEY

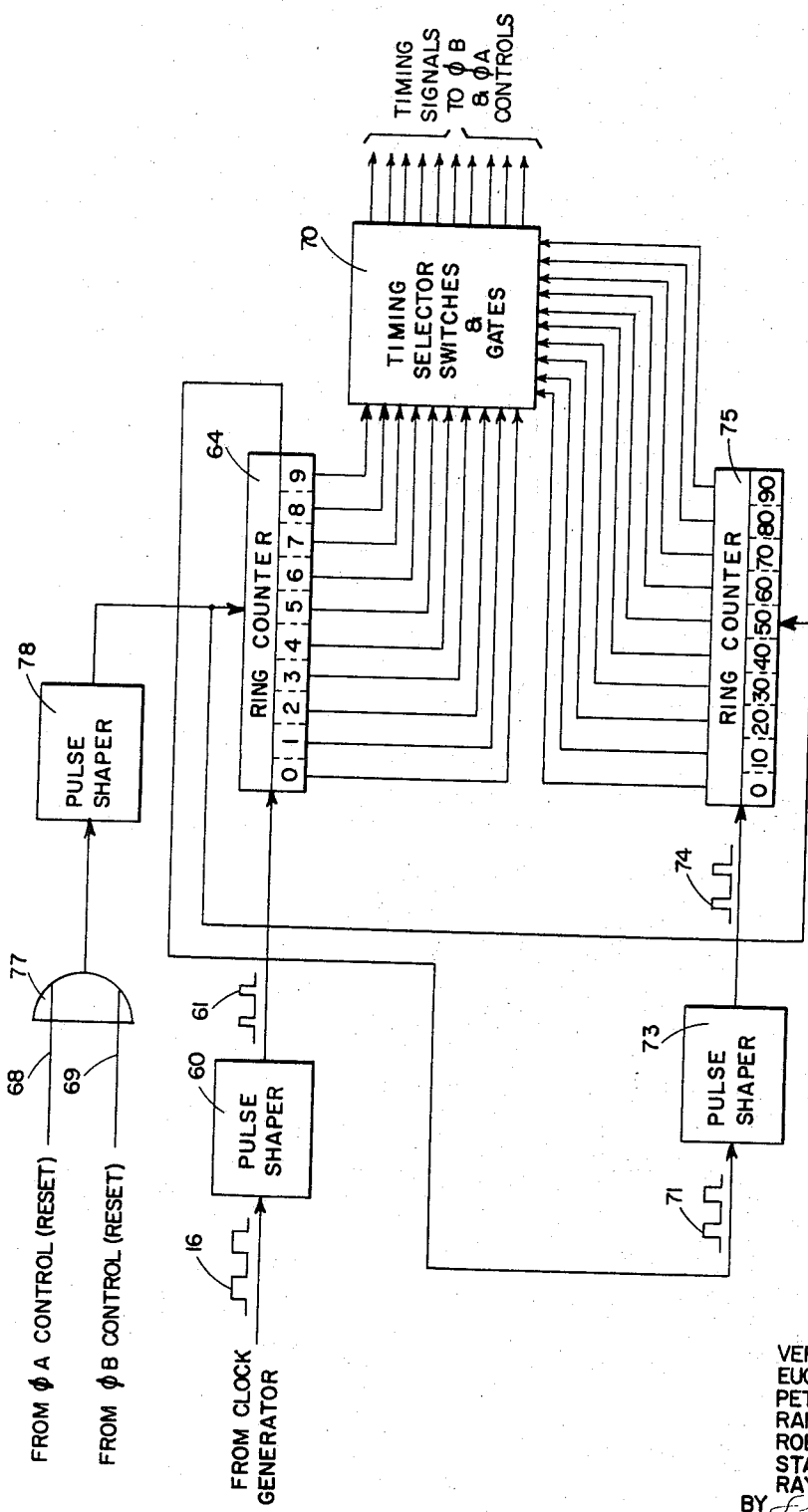

April 2, 1968  V. B. CRESS, JR., ETAL  3,376,546
TRAFFIC CONTROL SYSTEM
Filed June 28, 1965   9 Sheets-Sheet 5

INVENTORS
VERNOR B. CRESS, JR
EUGENE P. HOYT
PETER F. APITZ
RAMEY B. METZ
ROBERT D. POLLOCK
STANLEY M. KERBER
RAY W. CABE
BY *Edward A. Johnson*
ATTORNEY INVENTORS
VERNOR B. CRESS, JR
EUGENE P. HOYT
PETER F. APITZ
RAMEY B. METZ
ROBERT D. POLLOCK
STANLEY M. KERBER
RAY W. CABE
BY
ATTORNEY INVENTORS
VERNOR B. CRESS, JR
EUGENE P. HOYT
PETER F. APITZ
RAMEY B. METZ
ROBERT D. POLLOCK
STANLEY M. KERBER
RAY W. CABE
BY
ATTORNEY

3,376,546
TRAFFIC CONTROL SYSTEM

Vernor B. Cress, Jr., Rowland Heights, Eugene P. Hoyt, Santa Ana, Ramey B. Metz and Robert D. Pollock, Anaheim, Stanley M. Kerber, Fullerton, Ray W. Cabe, Manhattan Beach, and Peter F. Apitz, Placentia, Calif., assignors to Tamar Electronics Industries, Inc., Anaheim, Calif., a corporation of Delaware
Filed June 28, 1965, Ser. No. 467,397
15 Claims. (Cl. 340—37)

ABSTRACT OF THE DISCLOSURE

The clock pulse output of a clock generator is fed to a timer circuit, such timer circuit including a counter for counting the clock pulses and selector switch means for selecting various predetermined outputs of the counter. The various outputs from the selector switches are fed to logical gating control circuits, which are utilized to control the operation of traffic signals in accordance with a predetermined program and a response to pedestrian and vehicle actuators.

This invention relates to a traffic control system and more particularly to such a system which utilizes digital type circuitry and lends itself to solid state components.

Control systems for traffic signals generally operate either in a pre-timed cyclical manner in response to a program, or in response to traffic and pedestrian conditions as appropriately sensed by pedestrian and vehicle switches in what is generally termed an "actuated" type of operation. A typical system for controlling traffic at a main artery which intersects with a side street, maintains a green signal on the main artery at all times unless an appropriate signal is provided at the cross street by either vehicle or pedestrian actuation of a switch. A predetermined time after such actuation, the artery light goes red and the cross-street light goes to green. The green signal is held in the cross street to allow vehicle and pedestrian traffic to pass for up to a predetermined maximum time period, after which the green signal returns to the main artery. This type of operation is referred to as "semi-actuated" operation. Also, "fully actuated" operation may be utilized with the green signal shifting back and forth between two streets after predetermined time intervals, in response to vehicle and pedestrian demand, with each street keeping the green signal until a demand on the other street appears.

In the traffic control systems of the prior art for mechanizing these operations, electromechanical timers and relay units are generally utilized. Where electronic type timers are utilized, they are generally of the analog type utilizing resistive-capacitive timing circuits. The electromechanical circuitry of prior art traffic control systems has several shortcomings. Firstly, such units tend to be rather bulky and heavy, making their installation, handling and servicing more difficult than would be desired. Further, such units generally consume considerably more power and dissipate more heat than solid state circuitry. Still further, the systems of the prior art do not lend themselves to modular construction, such that the adaptability of such systems to ready modification to suit various requirements is not feasible. A particular inherent shortcoming of prior art systems lies in their analog timing circuits which tend to be inaccurate when initially set unless closely calibrated with a timepiece and once so set, tend to change in their timing with variations in temperature, voltage and circuit components.

The system of this invention overcomes the shortcomings of prior art traffic control systems in providing a digitally implemented system utilizing solid state components for such implementation. With the utilization of such solid state components, the bulk, weight and power consumption of the system is minimized. Further, the system units are designed so that they can readily be removed and replaced or additional units added to the system to meet various more complex application requirements. This modular type of construction also greatly facilitates the servicing of the system, making it possible to readily replace defective modules in the field. The digital solid state circuitry utilized particularly lends itself to this type of modular construction. Particularly close timing accuracy is achieved by virtue of the digital timing circuits utilized, these circuits being synchronizable with an AC power line.

The system of the invention utilizes a clock generator, comprising solid state dividers, which is synchronized with the power line. The precisely timed clock pulses are fed to solid state timer circuits, which may utilize ring counters. These timer circuits generate precise timing signals over the entire range of timing required, so that a plurality of timing signals are available to be selected to be used to control various desired operations. These timing signals are utilized in logical gating controls which control the traffic signal in accordance with a predetermined sequence of operation and in response to pedestrian and vehicle actuators. The system of this invention thus applies digital techniques, including logical gating circuitry, to achieve the traffic control functions.

It is therefore an object of this invention to provide an improved traffic control system.

It is a further object of this invention to provide a traffic control system utilizing digital techniques and solid state circuitry.

It is still another object of this invention to improve the timing accuracy of a traffic control system.

It is still a further object of this invention to provide an improved traffic system having greater reliability than prior art systems.

It is still another object of this invention to provide a traffic control system which readily lends itself to modular construction.

It is still a further object of this invention to provide a traffic control system which is of relatively compact construction.

It is still another object of this invention to provide a traffic control system having lower power requirements than prior art systems.

It is still another object of this invention to provide a traffic control system which readily lends itself to modification in the field to operate in various modes.

Other objects of this invention will become apparent from the following description taken in connection with the accompanying drawings, of which FIG. 1 is a block diagram illustrating a typical system of the device of the invention.

FIG. 3 is a block diagram illustrating a main timer which may be utilized in the inventive system.

Figure 1:
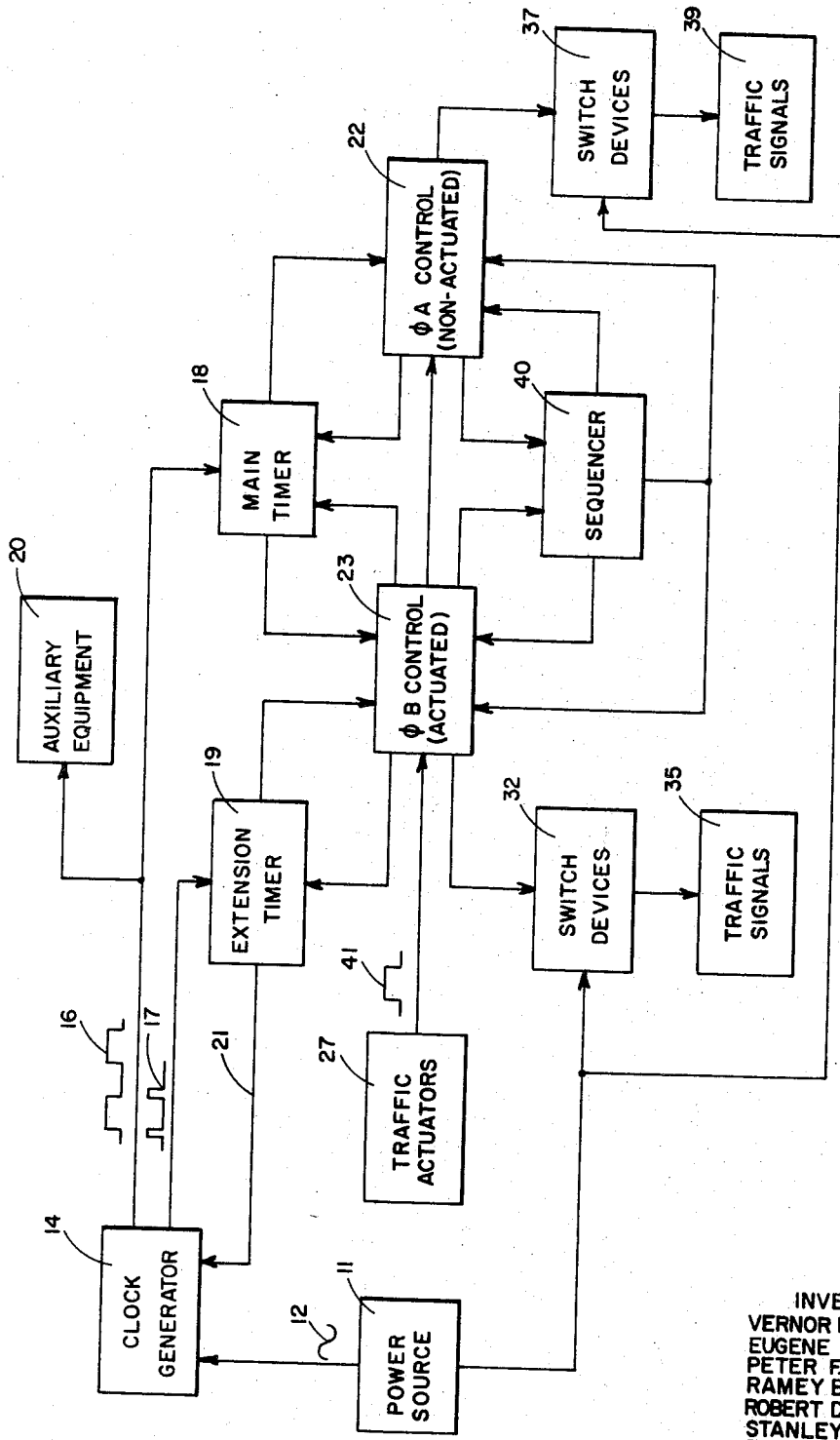

Referring now to FIG. 1, a block diagram showing a basic system is presented. For illustrative purposes the system is shown as a semi-actuated one having two phases, one of them being an actuated phase (referred to as phase B) and the other being a non-actuated phase (referred to as phase A). It is to be clearly understood, however, that this same system can be adapted by one skilled in the art to operate with additional control phases or may utilize two actuated phases or programmed phases as application requirements may dictate.

Synchronizing signals 12 are fed from power source 11 to clock generator 14. Power source 11 is preferably a commercial power line having an AC output which is frequency regulated. Clock generator 14, which may comprise a series of divider circuits, has pulse outputs 16 and 17 at a frequency which may be of the order of 1 pulse per second. Clock pulses 16 and 17 are fed to main timer 18 and extension timer 19 respectively. Clock pulses 16 may also be used to synchronize auxiliary equipment 20 which may, for example, comprise a signal flasher unit. As to be explained in connection with FIG. 2, separate circuits are utilized to generate clock pulses 16 and 17 to enable the resetting of the circuit generating pulses 17 by a re-set signal sent from extension timer 19 on line 21. This re-set signal is utilized to assure close timing accuracy (of the order of $\frac{1}{10}$ second) in the generation of short timing cycles (of the order of 1–3 seconds).

Figure 10:
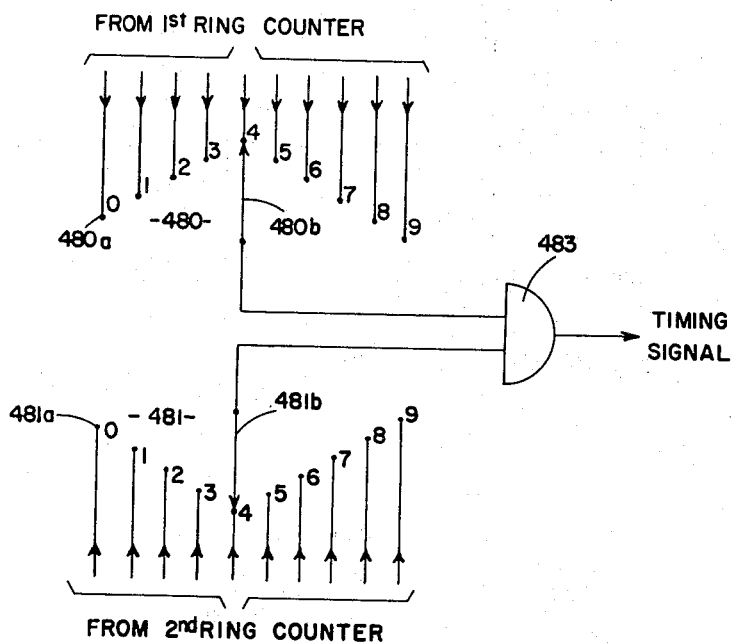
FIG. 10 is a schematic drawing of a switching circuit which may be utilized to select timing signals for use in the inventive system.
Figure 4:
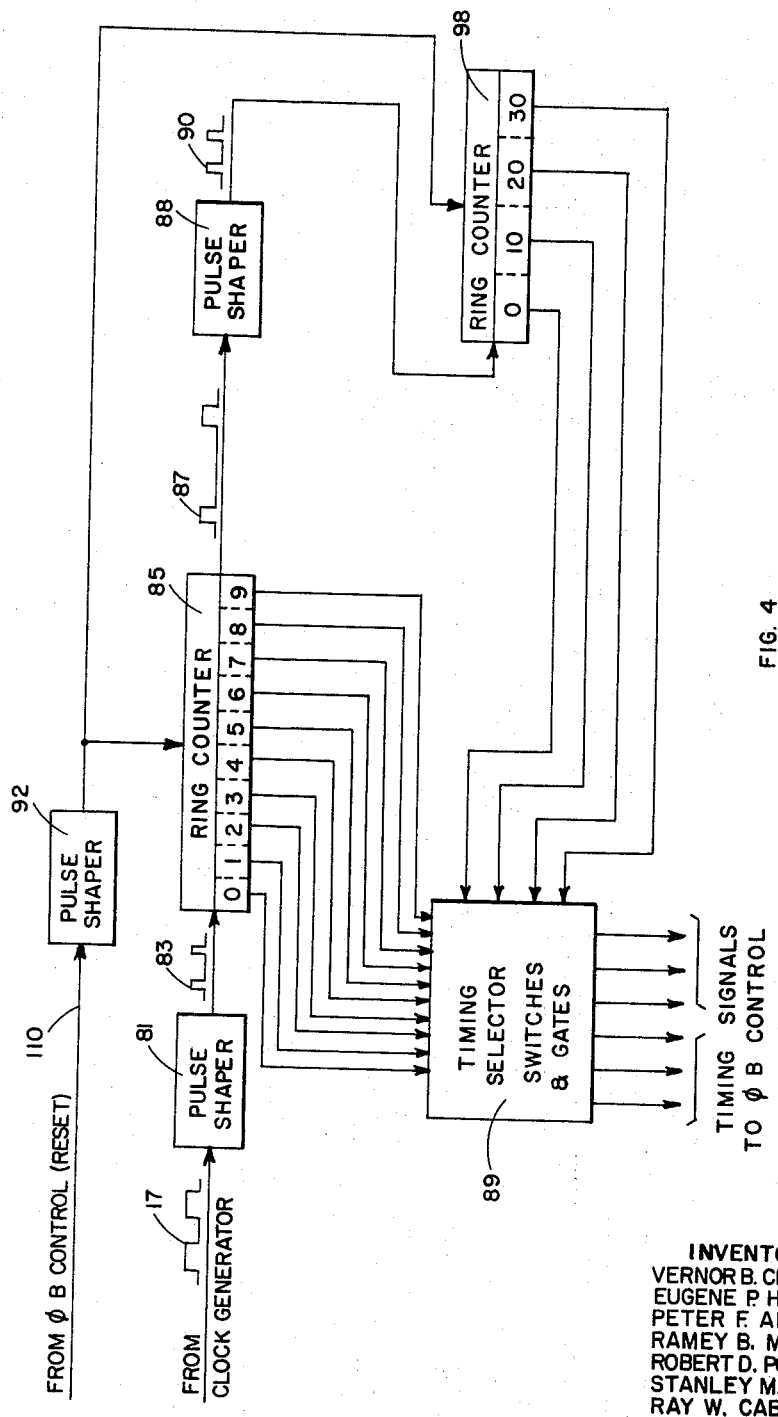
FIG. 4 is a block diagram of an extension timer which may be utilized in the inventive system.

A number of timing selector switches are provided in both main timer 18 and extension timer 19 to enable the selection of various timing cycles for use by phase A control 22 and phase B control 23. These timing signals, which are generated as to be explained in connection with FIGS. 3, 4 and 10, provide actuation signals to predetermined portions of phase A control 22 and phase B control 23, after the selected time interval in each particular case has elapsed, as will be explained in connection with FIGS. 6–9. In the absence of an actuation signal from traffic actuators 27, phase B control actuates switch devices 32 so as to maintain the red signal lamps of traffic signals 35 actuated. Traffic signals 35 would normally be facing a cross street. At the same time, phase A control 22 controls switch devices 37 so as to maintain traffic signals 39, which normally face the artery street, in the "green" state. Sequencer 40 operates to prepare phase A control 22 for a switch-over when a particular series of timing sequences has occurred. Thus, for example, phase A control 22 is not prepared for and therefore cannot be caused to switch traffic signals 39 to a "yellow" and then a "red" state until a predetermined minimum "green" timing cycle has been completed, thus assuring that traffic signals 39 will stay "green" for at least this minimum time period.

A change-over from one control phase to the other is initiated by a control pulse 41 from traffic actuators 27 which may comprise vehicle and pedestrian control switches. Control pulse 41 is fed to logic circuitry in phase B control 23, and if proper conditions are indicated for switch-over, a "call" signal is fed to phase A control 22. Assuming that the minimum "green" time for traffic signals 39 has elapsed, the logic circuitry of phase A control 22 is actuated to provide a sequence advance signal to sequencer 40. The sequencer, in response to the sequence advance signal, provides a sequence control signal back to phase A control, which brings this control to a succeeding sequence. The sequences then advance in order as their timing cycles are completed, to bring traffic signals 39 successively to a "yellow" state, and finally to a "red" state, all of this being accomplished in accordance with pre-set timing signals received from main timer 18.

When the final sequence of the phase A control cycle has been completed, sequencer 40, which provides phase control signals to both phase A control 22 and phase B control 23, as will be explained in connection with FIG. 5, produces a change over to the phase B control cycle. This is accomplished when the phase A control has switched traffic signals 39 to the "red" condition, and enables the switching of traffic signals 35 to the "green" condition.

Phase B control is then sequenced through its cycle in response to the timing signals received from main timer 18 and extension timer 19 in accordance with the various predetermined timing parameters in the phase B timing cycle. These timing parameters include, for example, an initial "green" time and an extension of an initial "green" time by virtue of a subsequent traffic actuation up to a predetermined maximum time. Phase B control 23 also includes a memory circuit which enables a subsequent return to the phase B cycle in a situation where a vehicle may actuate one of traffic actuators 27 at a time in the cycle when it is too late to permit its passage through the intersection prior to the termination of such cycle. Let us now examine the various individual portions of the system.

Figure 2:
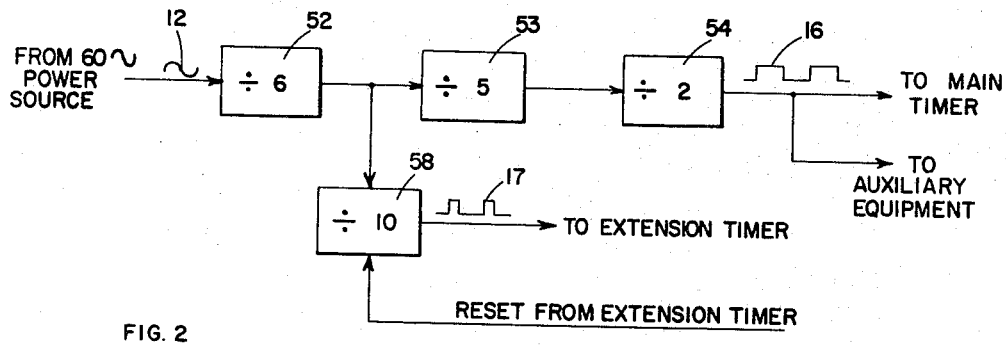
FIG. 2 is a block diagram illustrating a clock generator which may be utilized in the inventive system.

Referring now to FIG. 2, a clock generator which may be utilized to generate the basic timing pulses is illustrated in block diagram form. The clock generator receives an AC signal 12 from the 60-cycle AC power source, and divides this 60-cycle signal by 60 to produce 1 pulse per second wave trains 16 and 17. The AC signal 12 is first divided by six in frequency divider 52. The clock pulses 16 for the main timer are generated by means of divider 53, which divides by five, and divider 54, which divides by two, these dividers being cascaded. Clock pulses 16 may also be utilized for driving auxiliary equipment such as, for example, a flasher signal unit. The clock pulses 17 for the extension timer are generated by means of divider 58, which divides by ten. A separate divider 58 is utilized for generating the clock pulses 17 for the extension timer because of the necessity for resetting the clock pulses for the extension timer to assure the necessary timing accuracy on certain of the extension timer timing cycles which are of the order of 1–3 seconds. The resetting of the divide-by-ten divider 58 assures timing accuracy to within $\frac{1}{10}$ of a second. Conventional frequency divider circuits may be utilized for frequency dividers 52, 53, 54 and 58. A typically staircase wave generator frequency divider circuit which is suitable for this purpose is described, for example, on page 197 of the General Electric Transistor Manual, 6th edition, published in 1962. One pulse per second clock pulses 16 and 17 which are accurately synchronized with the power line are thus generated.

Referring now to FIG. 3, a main timer which may be utilized in the device of the invention is illustrated. Clock pulses 16 from the clock generator are fed to pulse shaper 60, which produces relatively sharp output pulses 61 which are synchronized with the leading edges of pulses 16 and are thus spaced one second apart. Pulse shaper 60 may comprise a resistive-capacitive differentiating circuit, the positive going output pulses of which drive a monostable multivibrator. Such multivibrator may have an "on" cycle of the order of 20 microseconds. Pulse shaper 60 thus provides sharp output pulses 61 which are synchronized with the leading edges of input pulses 16. Pulses 61 are used to drive ring counter 64. Ring counter 64 may be a conventional ring counter, such as, for example, that described on page 365 of the aforementioned General Electric Transistor Manual. Ring counter 64 operates to successively produce outputs at each of its output stages 0–9, as pulses 61 appear. An output remains at any stage of the ring counter until the ring counter is again driven by an input pulse 61 to move the output to a succeeding stage. Thus, for example, with input pulses 61 spaced by one second, one-second duration pulses will appear sequentially at output stages 0–9. Thus a one second output pulse will appear at each of the stages of the counter every ten seconds in the indicated sequence.

The outputs 0–9 of ring counter 65 are fed to timing selector switches and gates 70, where they may be appropriately selected in conjunction with the outputs of ring counter 75, as to be described in connection with FIG. 10, to produce various predetermined timing control signals.

The output 71 of stage 9 of ring counter 64 is also fed to pulse shaper 73. Pulses 71 which arrive every ten seconds and are of one second duration are shaped by pulse shaper 73 to produce relatively sharp pulses 74, spaced ten seconds apart, which are synchronized with the leading edges of pulses 71. Pulses shaper 73 and ring counter 75 are similar in their configurations and operation to pulse shaper 60 and ring counter 64. Ring counter 75 thus produces successive signals at each of its output stages 0–90 every ten seconds, the output signals on each of the stages being of ten second duration. The outputs of ring counter 75 are also fed to timing selector switches and gates 70. Timing selector switches and gates 70 include a plurality of selector switches and gates capable of producing output control signals at any time between 1 and 99 seconds from a predetermined starting time. Thus, for example, if a timing signal at "75 seconds" is desired, appropriate selector switches are set to select the "70" stage output of counter 75 and the "5" stage output of counter 64, and these signals are both fed to an AND gate. When this AND gate simultaneously receives the outputs of the "70" stage of counter 75 and the "5" stage of counter 64, an output signal is generated, such signal corresponding to the desired 75 second timing interval. As many selector switches and gates can be utilized as is necessary to produce all of the separate timing control signals needed in the system. The counters 64 and 75 are appropriately reset to initiate new timing cycles by "reset" signals fed on lines 68 and 69 from the phase A and phase B control circuits respectively. The reset signals are fed to OR gate 77 and thence through pulse shaper 78 to the ring counters.

Referring now to FIG. 4, an extension timer which may be utilized in the device of the invention is illustrated. Clock pulses 17 from the clock generator are fed to pulse shaper 81. Pulse shaper 81 operates similarly to pulse shapers 60 and 73 described in conjunction with the main timer, to produce relatively sharp pulses 83 spaced one second apart and synchronized with the leading edges of pulses 17. As already noted, pulse shaper 81 may comprise a resistive-capacitive differentiator, the positive going output of which drives a monostable multivibrator. Ring counter 85 operates similarly to ring counter 64 to produce sequential output signals from stages 0–9 in response to input pulses 83. These sequential pulses are fed to timing selector switches and gates 89. The output 87 of the "9" stage of ring counter 85 is fed to pulse shaper 88 which is similar in configuration to pulse shaper 81, and which produces sharp output pulses 90 spaced at 10-second intervals.

Pulses 90 are fed to drive ring counter 98 which is similar in its general configuration and operation to ring counter 85. The four stages of ring counter 98 have outputs representing "0," "10", "20" and "30" second timing. The outputs of ring counters 85 and 98 are fed to timing selector switches and gates 89 where, in the same fashion as described in connection with timing selector switches and gates 70, various timing signals can be produced for timing cycles anywhere between 1 and 39 seconds. Reset signals are fed from the phase B control to pulse shaper 92 and thence to ring counters 85 and 98 to zero these units in initiating a new timing cycle.

Figure 5:
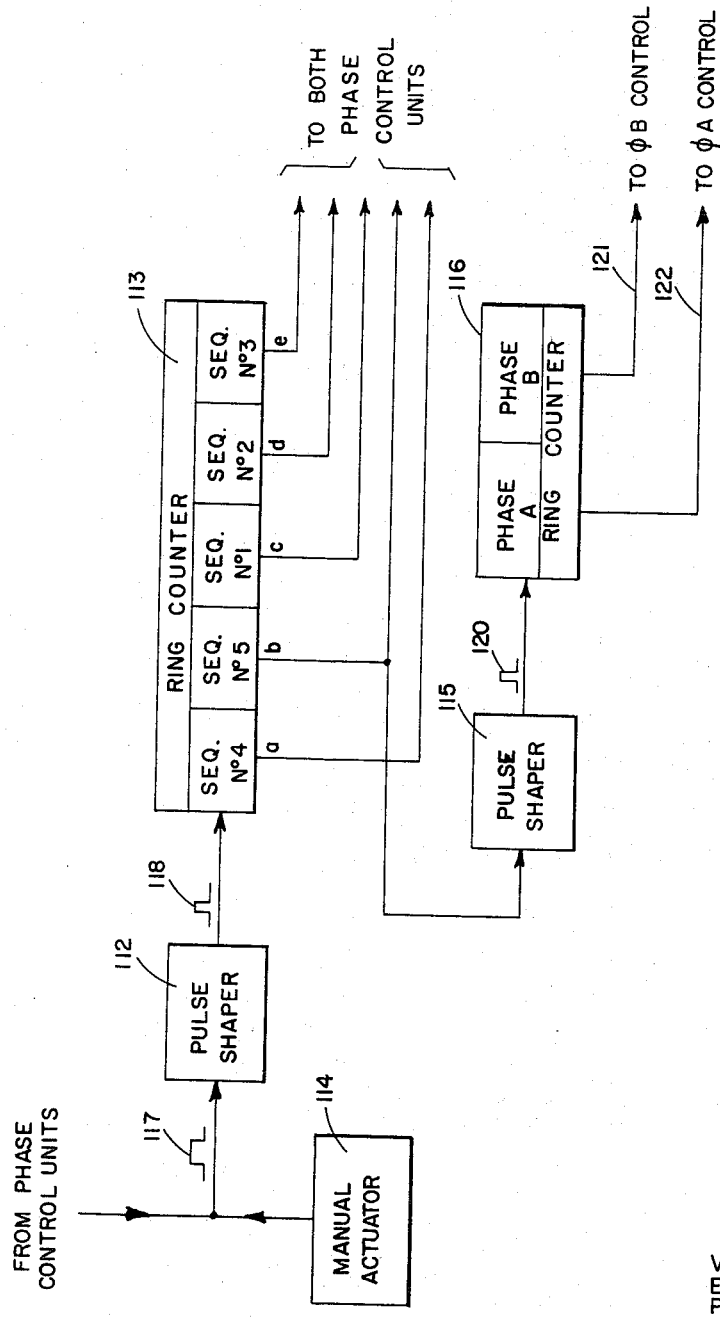
FIG. 5 is a block diagram of a sequencer which may be utilized in the inventive system.

Referring now to FIG. 5, a sequencer unit which may be utilized in the device of the invention is illustrated. The sequencer is used to control the cycling of the various sequences of each traffic phase. Along these lines, for example, in an artery movement (phase a control) there may be five sequences. The first of these sequences is the minimum guaranteed "green" sequence, i.e., the signal to the artery is always maintained in the "green" condition for at least this minimum time period. At the end of this minimum time period, the sequence moves ahead to a second sequence which is generally referred to as a "rest" condition. In this "rest" condition the artery will continue to hold its "green" condition, but if there should be an actuation signal from the side street, such as from a pedestrian or vehicle actuator, the sequencer moves ahead to a third sequence in its cycle. This third sequence may be a pedestrian clearance sequence, during which a flashing "Don't Walk" occurs. The fourth sequence occurs after the predetermined timing period in the third sequence, this fourth sequence producing a "yellow" signal on the main artery. After the "yellow" timing has occurred, as to be explained in connection with FIG. 6, a fifth sequence of operation is entered. This fifth sequence is referred to as an "all red" clearance on the main artery. When this sequence is entered, a "red" signal on the main artery occurs simultaneously with a "red" on the cross street. After the predetermined "all red clearance" timing cycle has been completed, control is switched over to the cross street phase (phase B), and the sequencer is then used to control the operation of this second phase.

Figure 6:
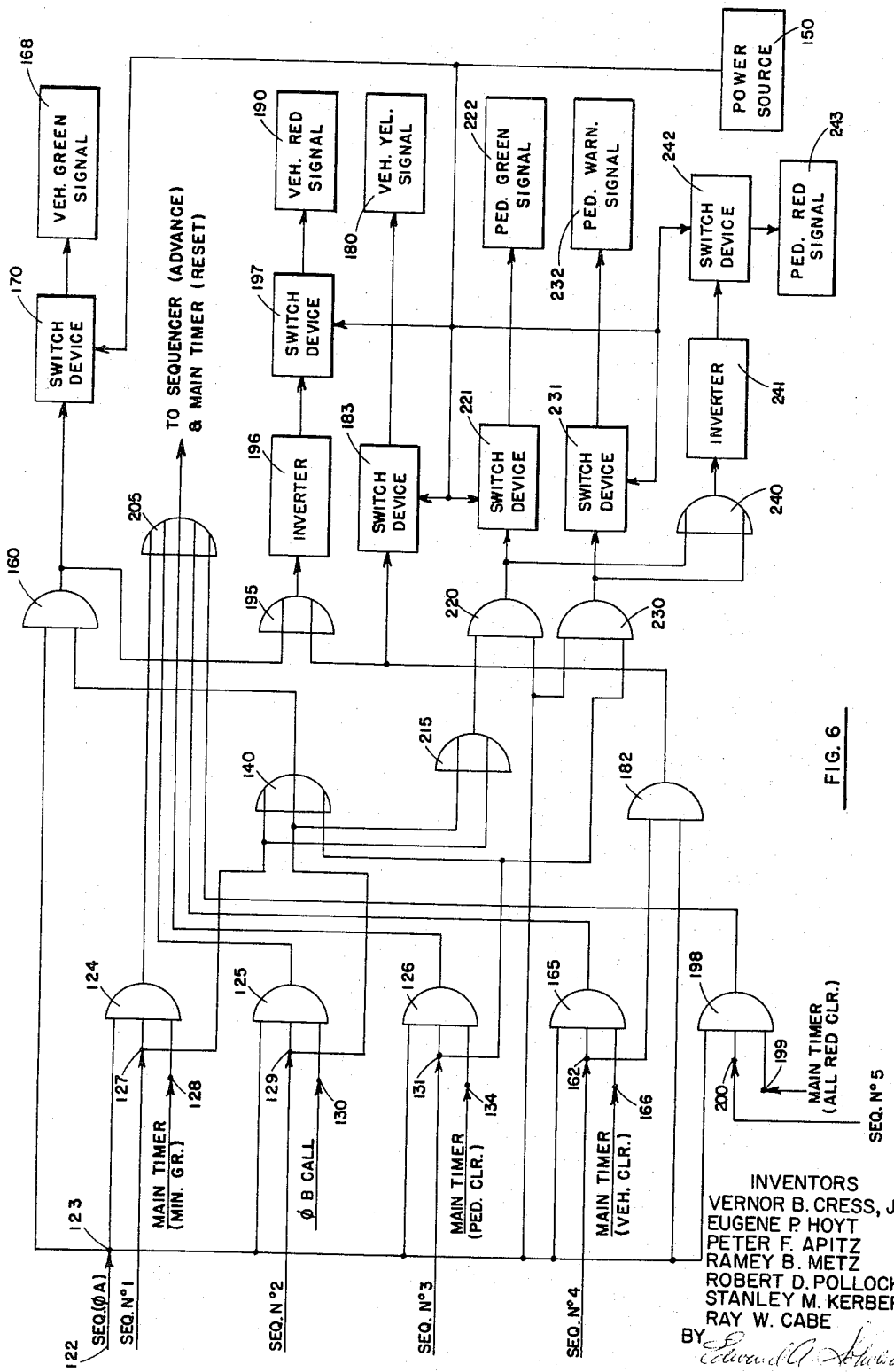
FIG. 6 is a schematic drawing illustrating a phase A control circuit which may be utilized in the device of the invention.
Figure 7:
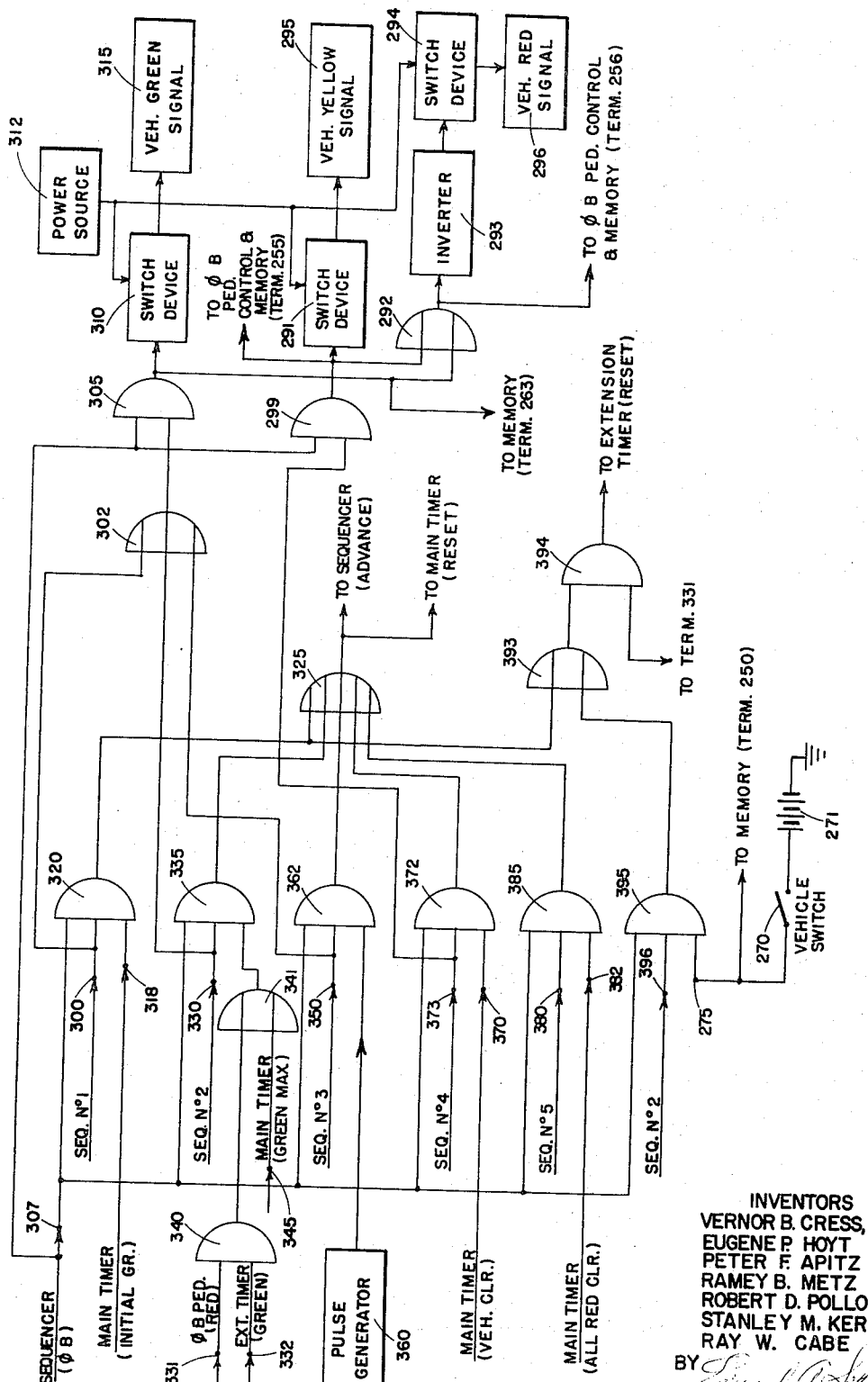
FIG. 7 is a schematic drawing illustrating a phase B control circuit responsive to vehicle actuation which may be utilized in the inventive system.

Input control pulses 117 are fed to pulse shaper 112 from either the phase A or B control units of FIGS. 6 or 7. Pulses 117 may also be generated by means of manual actuator 114, where such manual actuation must be performed as, for example, when the control circuits are not functioning properly.

Pulse shaper 112 comprises a differentiator circuit and a monostable multivibrator which operates in response to pulses 117 to generate sharp output pulses 118 synchronized with the leading edges of pulses 117. Pulses 118 are fed to ring counter 113 which may be similar in configuration to the ring counters 64 and 75 described in connection with FIG. 3. Each input pulse 118 fed to ring counter 113 advances the counter once. Thus, the stages of the counter are successively actuated with succeeding input pulses to provide sequential outputs on lines a–e. As to be explained in connection with FIGS. 6–9, these sequencing signals are utilized in logical control circuitry to obtain the various desired control functions in a predetermined sequence. It is to be noted that operation of counter 113 starts with sequence number 4. This is to satisfy a common specification requirement that the "yellow" sequence (Sequence 4) be the initial position when the unit is turned on from a cold start.

The output of the "sequence number 5" counter unit is fed on line b to pulse shaper 115 which is similar in configuration to pulse shaper 112 and which generates a sharp pulse 120 in response to the trailing edge of the signal on line b. Pulse 120 drives ring counter 116 and switches the output from the phase A state to the phase B state or vice versa as the case may be. Thus, with the completion of sequence number 5, a phase control signal is produced on line 121 or line 122 as the case may be, to switch the phase of operation as to be explained in connection with FIGS. 7–9. The sequencer thus provides control signals for sequentially actuating the portions of each control phase and for switching operation from one phase to the other when all the sequences have been completed, such operation being in response to the logical control signals from the phase control units themselves.

Referring now to FIG. 6, the phase A logical control circuitry is illustrated. As already noted, the phase A control is utilized to control the signal lights on a main artery, and in the absence of a call signal indicating either pedestrian or vehicle traffic on the side street, maintains the signal lights on such artery in a "green" condition. In the absence of any such actuation signal, phase A control will normally be in a "rest" position with ring counter 113 (FIG. 5) in the sequence number 2 state and counter 116 in a phase A condition, with the corresponding signals therefor appearing at terminals 129 and 123 respectively. In this situation, AND gate 125 only requires a phase B call signal at terminal 130 to be actuated, and in effect, "rests" waiting such actuation. With the arrival of a phase B call signal at terminal 130 from the output of the phase B control memory (see FIG. 9), AND gate 125 is actuated to produce a signal to the input of OR gate 205. This produces an output from OR gate 205 which is fed to the sequencer (FIG. 5) to advance the counter to the sequence number 3 state, thereby resulting in a signal at terminal 131.

This third sequence is utilized to provide the timing control signal for the pedestrian clearance portion of the cycle. This timing signal is fed to terminal 134 from an appropriate selector switch and gate in timing selector switches and gate 70 of the main timer. When this tming cycle has been completed, AND gate 126 produces an output signal to OR gate 205 resulting in a signal from this OR gate to again advance the sequencer, this time to sequence number 4. The sequence number 4 signal is received at terminal 162 and is fed therefrom to AND gate 165. AND gate 165 has a TRUE output in response to the simultaneous occurrence of signals at terminals 123, 162 and 166, the signal appearing at terminal 166 when a vehicle clearance timing cycle has been completed, this being determined by an appropriate switching and gating unit in timing selector switches and gate 70 of the main timer.

It is to be noted that during sequences 1, 2 and 3, the vehicle "green" signal 168 on the main artery is kept actuated. This is achieved by means of OR gate 140 and AND gate 160, OR gate 140 producing an output to AND gate 160, when the sequence 1, 2 or 3 signals are present at terminals 127, 129, or 131 respectively. Under such conditions and with the presence of the phase A signal at terminal 123, AND gate 160 is TRUE and actuates switch device 170 which connects power from power source 150 to vehicle "green" signal 168.

With the arrival of the pedestrian clearance signal at terminal 134 and the actuation of AND gate 126 to advance the sequencer to sequence number 4, OR gate 140 is switched to the false state in view of the absence of either a sequence number 1, sequence number 2, or sequence number 3 signal at its input, and vehicle "green" signal 168 is turned off. At the same time, sequence number 4 signal is fed from terminal 162 to AND gate 182. This gate is thus actuated to the TRUE state (phase A control being present at terminal 123) and operates to actuate switch device 183, thereby connecting power from power source 150 to vehicle "yellow" signal 180. Thus, the "yellow" signal on the artery is actuated. The "yellow" signal timing is provided by a vehicle clearance signal fed from the main timer to terminal 166. As for the other timing signals already described, the timing cycle for this signal is determined by an appropriate selector switch in timing selector switches and gates 70. It is to be noted that to assure the proper timing from ring counters 64 and 75 of the main timer (see FIG. 3), a counter reset signal is fed thereto from OR gate 205 in response to the output of either AND gate 124, 125, 126, 165 or 198, thus assuring the initiation of a new timing cycle for each timing operation.

With the completion of the vehicle clearance ("yellow") timing cycle as indicated by a signal at terminal 166, a TRUE output from AND gate 165 is fed to OR gate 205 to advance the sequencer to sequence number 5. The sequence number 5 signal appears at terminal 200, which is connected to AND gate 198. At the completion of a predetermined timing cycle as again determined by a predetermined timing selector switch in the main timer, and in this case which determines the timing of the "red" signal in the main artery, a signal appears at terminal 199. This results in AND gate 198 being actuated to produce a signal to OR gate 205 to advance the sequencer to the sequencer number 1 position.

Vehicle "red" signal 190 is controlled by means of a NOR gate, including OR gate 195 and inverter 196. Fed to OR gate 195 are the outputs of AND gates 182 and 160, which control the vehicle "yellow" signal 180 and vchicle "green" signal 168, respectively. The output of OR gate 195 is inverted by means of inverting amplifier 196 so that a control signal is fed to switch device 197 when there is neither a TRUE signal at the output of AND gate 182 nor the output of AND gate 160. By this logical switching mechanism, switch device 197 is actuated to provide power to the vehicle "red" signal 190 when neither the vehicle "yellow" signal 180 nor the vehicle "green" signal 168 is being actuated. This, of course, only occurs during sequence number 5 of the timing cycle, and when the sequencer is serving phase B.

Let us now examine the operation of the pedestrian signals during the various sequences of the cycle. Pedestrian "green" signal 222 is actuated during sequencer number 1 and number 2. This is by virtue of the signals fed to OR gate 215 from terminals 127 and 129. The output of OR gate 215 is fed to AND gate 220, which in response to the phase A signal and the output of OR gate 215 actuates switch device 221 to provide power from source 150 to pedestrian "green" signal 222.

During the sequence number 3 operation, AND gate 230 is actuated, thereby causing switch device 231 to actuate pedestrian warning signal 232. The time duration of sequence number 3 is determined by the pedestrian clearance signal fed to terminal 134 from the main timer, which thus determines the duration of the pedestrian warning signal 232. Finally, the pedestrian "red" signal 243 is actuated by NOR gating logic, just as was the vehicle "red" signal. This NOR gate includes OR gate 240 and inverter 241. Thus, when neither pedestrian "green" signal 222 nor pedestrian warning signal 232 are being actuated, as indicated by the absence of TRUE signals at the outputs of both AND gate 220 and AND gate 230, switch device 242 is actuated to feed power from power source 150 to actuate pedestrian "red" signal 243.

With the completion of the "red" clearance timing, as indicated by the appearance of a signal at terminal 199, the output of AND gate 198 is fed through OR gate 205 to advance the sequencer of counter 113 to the sequence number 1 position, and at the same time shifts counter 116 from phase A to phase B control. The phase B control cycle will be reviewed in connection with FIGS. 7-9, but to complete the description of phase A control, let us assume that this control cycle has been completed and we have returned to phase A operation with a sequence number 1 signal appearing at terminal 127. A minimum "green" timing signal, which is again set on an appropriate selector switch of timing selector switches and gates 70 of the main timer, is fed to terminal 128. When this timing cycle has been completed as indicated by the appearance of a signal at terminal 128 and simultaneously with the sequence number 1 signal at terminal 127 and the phase A signal at terminal 123, AND gate 124 produces a TRUE output to OR gate 205 to advance the sequencer to the sequence number 2 position. Thus, a minimum "green" timing in the phase A control operation is assured before we can advance to the sequence number 2 "rest" state. The phase A control is thus restored to provide "green" signal operation on the main artery, ready again to be actuated by a phase B call signal at terminal 130, in which condition the description of the operation of the phase A control was commenced.

Figure 9:
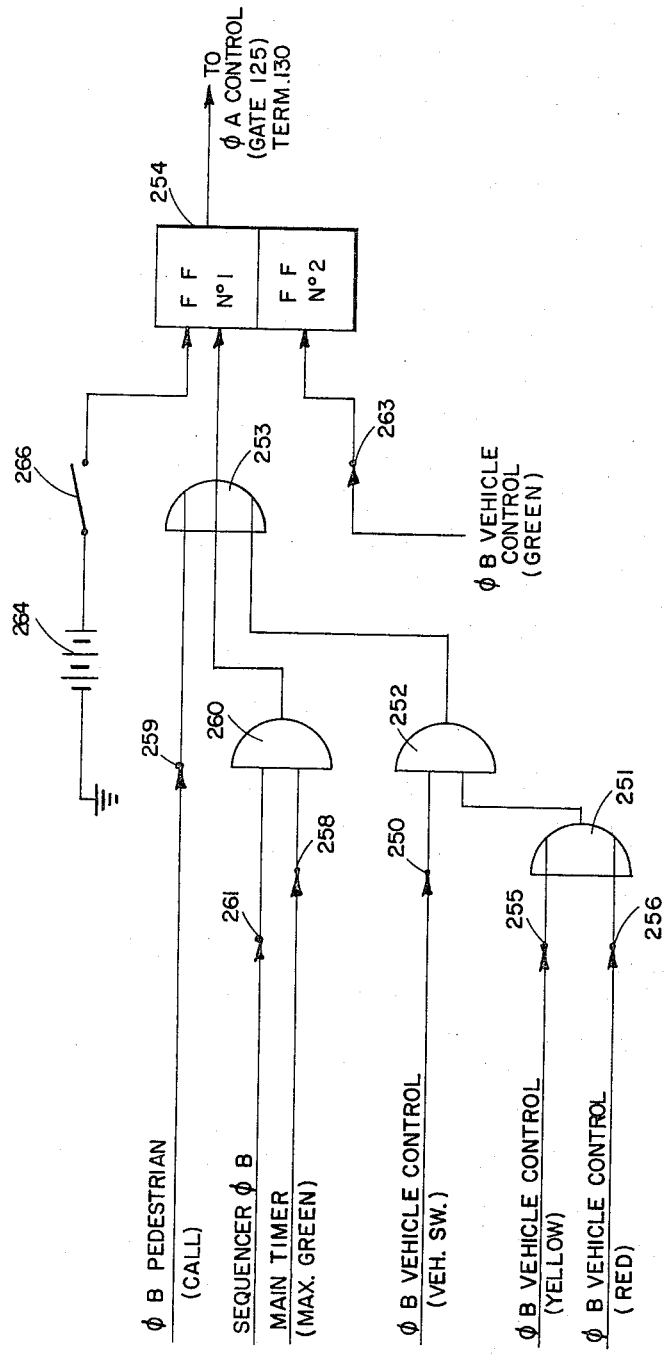
FIG. 9 is a schematic drawing of a memory circuit which may be utilized with the phase B control of FIGS. 7 and 8.

Referring now to FIGS. 7 and 9, the phase B vehicle actuated control system is illustrated, FIG. 7 showing the logical control circuits associated solely with vehicle operation, and FIG. 9 showing the memory control circuit utilized for both the vehicle and pedestrian controls.

A vehicle entering the cross street actuates vehicle switch 270 thereby connecting DC power sources 271 to terminals 275 and 250 (FIG. 9). Let us assume that the "green" signal faces the artery with the phase A control held in the sequence number 2 "rest" condition. Under such circumstances, a red signal will be facing the cross street. Fed to the inputs of OR gate 251 (FIG. 9) through terminals 255 and 256 respectively are the outputs of AND gate 290 and OR gate 292 (FIG. 7) respectively. The output of AND gate 290 causes the actuation of the vehicle "yellow" signal 295, while the output of OR gate 292 controls the actuation of vehicle "red" signal 296. Thus, when either of these two signals is actuated, a TRUE signal appears at terminal 255 or 256, as the case may be. As the output of OR gate 251 is coupled to AND gate 252, AND gate 252 will have a TRUE output when vehicle switch 270 is actuated at a time when the traffic light on the cross street is in either the "red" or "yellow" condition. This will result in a TRUE signal being passed through OR gate 253 to actuate flipflop 254.

The output of flipflop 254 is connected to terminal 130 of the phase A control (FIG. 6), and provides the "call" signal which commences the cycling operation of the phase A control through its various sequences culminating in the switch-over from phase A control to phase B control, as explained in connection with FIG. 6.

Referring now particularly to FIG. 7, let us examine the operation of the phase B control after switch-over to phase B operation has occurred in response to a vehicle actuation. With the switch-over, the sequencer, as already explained, is in the sequence number 1 and phase B conditions. Under such circumstances, a sequence number 1 output fed to terminal 300 provides a TRUE signal at the output of OR gate 302 which is fed to AND gate 305. AND gate 305 simultaneously receives a TRUE signal from terminal 307 in view of the phase B condition of the sequencer. The TRUE output of AND gate 305 causes the actuation of switch device 310 so as to connect power from power source 312 to vehicle "green" signal 315. Thus, with the switch-over from phase A to phase B control, the "green" signal is actuated on the cross street, the "red" on the main artery, as already noted in connection with FIG. 6, having been actuated in the sequence number 5 condition of phase A control.

The initial "green" timing cycle is determined by a timing signal fed from an appropriate one of the timing selector switches and gates 70 in the main timer, which is fed to terminal 318. When this signal appears (simultaneously of course with the sequence number 1 and phase B signals at terminals 300 and 307 respectively) AND gate 320 provides a TRUE output to OR gate 325. The output of OR gate 325 is fed to the sequencer (FIG. 5) to advance the sequencer from the sequence number 1 to the sequence number 2 state.

The sequence number 2 output of the sequencer is fed to terminal 330 and thence to AND gate 335. This gate also receives the phase B output from the sequencer from terminal 307. A timing signal is fed from one of the timing selector switches and gates 89 of the extension timer to terminal 332. This timing signal determines the "green" timing cycle on the cross street for each vehicle actuation. A signal is fed to terminal 331 from AND gate 380 of the phase B pedestrian control (FIG. 8), indicating that the pedestrian control signal is in the "red" condition. Thus, when both the "green" vehicle timing signal appears at terminal 332 and a pedestrian "red" signal appears at terminal 331, AND gate 340 will have a TRUE output to OR gate 341. Under such conditions, OR gate 341 has a TRUE output which in the sequence number 2 phase B condition provides a TRUE output from AND gate 335. The TRUE output of AND gate 335 causes a TRUE output from OR gate 325 so as to advance the sequencer (FIG. 5) to the sequence number 3 condition. To assure such sequence advance under any circumstances in a maximum predetermined time period, a timing signal is fed from the main timer to terminal 345. This timing signal, which is appropriately set up on one of timing selector switches and gates 70 of the main timer, assures switchover back to a main artery "green" condition after a maximum predetermined time period has elapsed. The signal at terminal 345 provides an alternative signal to OR gate 341 to provide a sequence advance.

The sequence number 3 is not utilized in the phase B control and therefore is skipped over. Thus, with the appearance of the sequence number 3 signal at terminal 350, a pulse is simultaneously fed from free-running pulse generator 360 to AND gate 362, causing a TRUE output therefrom to pass through OR gate 325 so as to advance the sequencer to sequence number 4.

In sequence number 4, the cross street traffic light is switched to "yellow." This is achieved as follows: The sequence number 4 signal at terminal 373 is fed to AND gate 290 simultaneously with the phase B signal from the sequencer. The resultant TRUE output from AND gate 290 causes switch device 291 to be actuated and power is thereby fed from power source 312 to energize the vehicle "yellow" signal 295. It is to be noted that the vehicle "green" signal is maintained in the "on" condition throughout sequences 1–3 by virtue of the operation of OR gate 302. As will be noted, this OR gate receives the sequence 1–3 inputs from terminals 300–330 and 350 respectively and thus furnishes a TRUE output to AND gate 305 throughout these three sequences. With the arrival of sequence number 4, however, this TRUE signal to gate 305 terminates, and the "green" signal 315 is extinguished as "yellow" signal 295 goes on. The duration of the "yellow" signal is determined by the timing signal fed to terminal 370. This timing signal comes from one of timing selector switches and gates 70 in the main timer, which is pre-set to the desired "yellow" vehicle clearance timing cycle. When this timing cycle has been completed, the output of AND gate 372 goes to TRUE, this by virtue of the simultaneous sequence number 4 signal at terminal 373 and the phase B signal at terminal 307. The TRUE output of AND gate 372 produces a TRUE output from OR gate 325 to advance the sequencer to the sequence number 5 condition.

With the advance to the sequence number 5 condition, "yellow" signal 295 is extinguished by virtue of the termination of the sequencer signal at terminal 373. At the same time, vehicle "red" signal 296 goes on. This is achieved by virtue of the NOR logic provided by means of OR gate 292 and inverter 293. Fed to the input of OR gate 292 are the outputs of AND gates 305 and 290, which control the "green" signal 315 and the "yellow" signal 295 respectively. When there is neither an output from AND gate 305 nor from gate 290, indicating that both the "green" and "yellow" signals are extinguished, an output is produced from inverter 293 to actuate switch device 294, thereby connecting power from power source 312 to vehicle "red" signal 296. Thus, by means of NOR gate logic, "red" signal 296 is actuated during sequence number 5.

The sequence number 5 output is fed to terminal 380. Fed to terminal 382 is a timing signal from one of timing selector switches and gates 70 of the main timer. This pre-selected timing signal determines the phase B "red" timing cycle. When the timing signal appears at terminal 382 simultaneously with the sequence number 5 signal at terminal 380, and the phase B signal at terminal 307, AND gate 385 is caused to have a TRUE output which results in a TRUE output from OR gate 325 to advance the sequencer, this time shifting over to sequence number 1 and phase A operation.

The main timer is re-set also after each of the timing cycles to enable proper timing in a succeeding timing cycle by means of the output of OR gate 325. OR gate 325, as it will be noted, receives an output from each of AND gates 320, 335, 362, 372, and 385, and thus it is actuated at the end of each timing sequence. The extension timer is similarly re-set by the output of AND gate 394. AND gate 394 produces a TRUE output to re-set this timer when a phase B pedestrian "red" signal is present at terminal 331 simultaneously with an output from OR gate 393.

In the event that during a vehicle timing operation, a second vehicle should appear to actuate the vehicle actuator switch 270, the timing cycle is extended. This is achieved in the following manner: Let us first assume that we are in sequence number 2, i.e., that the vehicle "green" signal 315 is being actuated. Under such conditions, AND gate 395 is caused to have a TRUE output in view of the simultaneous appearance of the phase B signal at terminal 307, the sequence number 2 signal at terminal 396, and the vehicle actuation signal at terminal 275. This TRUE condition of AND gate 395 causes a TRUE signal to appear at the output of OR gate 393 and AND gate 394, which re-sets the counters 85 and 98 of the extension timer (see FIG. 4). The extension timer will therefore initiate a new timing cycle having the same duration as the initial timing cycle, and thus the switchover to sequence number 3, "yellow" signal operation, is delayed accordingly to permit the vehicle to pass. The only limitation on such timing cycle, as already noted, is the maximum "green" limitation imposed by virtue of the signal fed to terminal 345 when this maximum "green" timing cycle has elapsed.

Let us assume now that vehicle "yellow" signal 295 is "on" at the time that vehicle switch 270 is closed. Under such conditions AND gate 395 will not have a TRUE output in view of the absence of the sequence number 2 signal at terminal 396 and a new timing cycle will not be initiated. However, a memory function is accomplished to assure that the vehicle at the cross street which just actuated the actuator will be permitted to pass after the phase A control has completed its cycle and returned to sequence number 2 "rest" condition. This is achieved by virtue of the signal fed through switch 270 to AND gate 252 in the memory (FIG. 9) simultaneously with a signal from the output of OR gate 251 which is TRUE during the "yellow" timing interval, this TRUE condition occurring in response to the signal received at terminal 255 from AND gate 290. This produces a TRUE signal from OR gate 253 which triggers flipflop 254 so as to provide a phase B call signal at terminal 130 of phase A control (FIG. 6). Thus, when the phase A control again returns to its sequence number 2 "rest" condition, this call signal will be present to cause cycling of the phase A control culminating in switchover to the phase B condition to allow the waiting vehicle on the cross street to pass. It is to be noted that flipflop 254 is restored to its initial state by virtue of a signal fed to terminal 263 from the output of AND gate 305 during the phase B sequence number 1, which is the vehicle "green" sequence. Thus, a memory function is achieved whereby a vehicle which arrives during the phase B "yellow" or all "red" sequences is allowed to pass on a subsequent operation.

To make absolutely sure that a vehicle is not "trapped" at the cross street should the "maximum green" time have elapsed during the phase B operation with the vehicle not having had an opportunity to pass the intersection and not having initiated the memory function as indicated above inputs, as shown in FIG. 9 to AND gate 260 from terminals 258 and 261 cause this gate to actuate OR gate 253 to provide a call signal to subsequently re-initiate a phase B cycle of operation.

Figure 8:
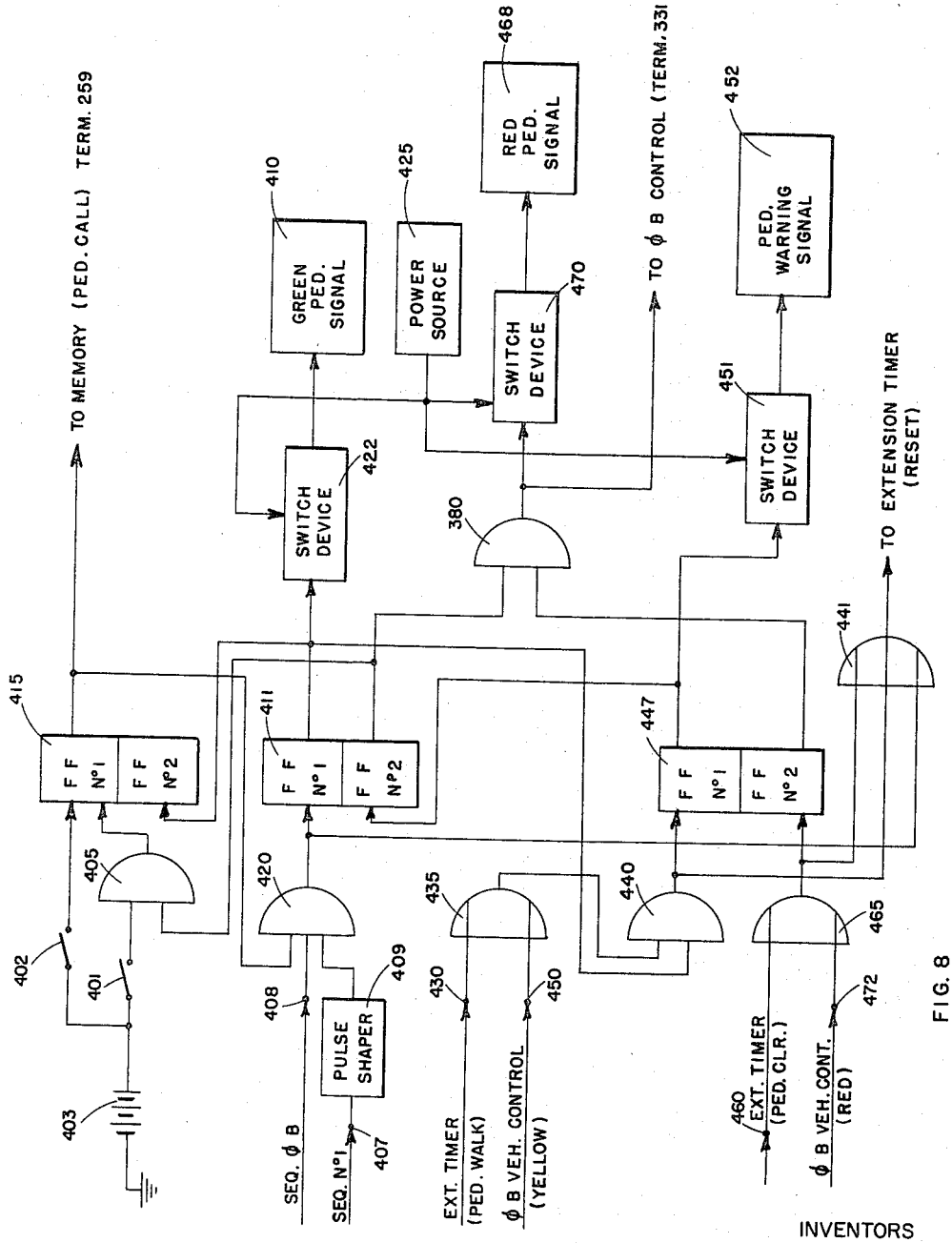
FIG. 8 is a schematic diagram of a phase B control circuit responsive to actuation by a pedestrian control switch, which may be utilized in the inventive system.

Referring now to FIG. 8, the phase B pedestrian control operation is illustrated. The pedestrian timing cycle is initiated by the closing of pedestrian switch 401 by a pedestrian wishing to cross the street. This provides an actuation signal from power source 403 to AND gate 405. If this occurs at a time when the "green" pedestrian signal 410 is not being actuated as evidenced by a TRUE output from the second stage (FF number 2) of flipflop 411, then AND gate 405 will produce a TRUE output to the FF number 1 stage of flipflop 415. Under such conditions the FF number 1 stage of flipflop 415 has a TRUE output which is fed to terminal 259 of the phase B memory (FIG. 9). This signal operates similarly to a vehicle call signal and produces an output signal from flipflop 254 of the memory to terminal 130 of the phase A control (FIG. 6). Phase A control thus is cycled through its various sequences. When the sequence number 1 condition of phase B control is reached, this signal is fed to terminal 407 which is connected to pulse shaper 409. Pulse shaper 409 generates a control pulse which is synchronized with the leading edge of the input pulse fed thereto. This control pulse is fed to AND gate 420. With inputs to AND gate 420 from pulse shaper 409, from terminal 408 which is connected to receive the sequencer phase B output, and from the output of FF #1 of flipflop 415, FF #1 of flipflop 411 is actuated to the TRUE condition and switch device 422 is thereby actuated. Switch device 422, when it is actuated, connects power from power source 425 to "green" pedestrian signal 410. When FF #1 of flipflop 411 goes to the TRUE condition, a re-set signal is provided to FF #2 of flipflop 415 to re-set the flipflop to its original unactuated condition, thereby removing the pedestrian call signal from terminal 259 of the memory (FIG. 9).

The timing cycle for "green" pedestrian signal 410 is determined by the timing signal fed to terminal 430 from an appropriate one of timing selector switches and gates 89 of the extension timer (FIG. 4). When this timing cycle has been completed, a signal from terminal 430 actuates OR gate 435 to the TRUE condition. The output of OR gate 435 is fed to AND gate 440 along with the output of FF #1 of flipflop 411. AND gate 440 thus receives the necessary inputs to drive it to the TRUE condition, thereby providing an actuation to FF #1 stage of flipflop 447. The output of FF #1 stage of flipflop 447 is fed to the FF #2 stage of flipflop 411 to provide a reset signal therefor. Flipflop 411 is thus re-set, at the end of the "green pedestrian" cycle, for a subsequent cycle of operation.

An output from OR gate 435 also results when a signal is present at terminal 450, such signal being received from the output of AND gate 290 when vehicle "yellow" signal 295 is "on" (FIG. 7). Thus, AND gate 440 produces a TRUE output when the "green" pedestrian signal 410 is being actuated simultaneously with the existence of either a phase B vehicle control "yellow" condition, or at the completion of the pedestrian "walk" timing cycle.

The output of FF #1 stage of flipflop 447, when driven by the output of AND gate 440, actuates switch device 451, which in turn actuates pedestrian warning signal 452 ("Don't Walk"). As has already been noted, with the actuation of FF #2 stage of flipflop 411, FF #1 stage of this flipflop is deactuated to cause "green" pedestrian signal 410 to go off.

The timing cycle of pedestrian warning signal 452 is determined by a signal which is fed to terminal 460. This signal is generated in a pre-determined one of the timing selector switches and gates 70 of the extension timer (FIG. 4). When this timing signal appears at terminal 460, OR gate 465 is actuated to in turn produce a TRUE output at FF #2 stage of flipflop 447. This signal is fed to AND gate 380. With the actuation of FF #2 stage of flipflop 447, pedestrian warning signal 452 is extinguished and "red" pedestrian signal 468 goes on. "Red" pedestrian signal 468 receives power from power source 425 through switch device 470 by virtue of the TRUE condition at the output of AND gate 380 which actuates the switch device. Such a TRUE condition is achieved by virtue of the inputs from the FF #2 stage of flipflop 447 and the FF #2 stage of flipflop 411, coinciding with an "off"

condition of pedestrian "warning" signal 452 and pedestrian "green" signal 410, respectively. To assure that the pedestrian "red" signal 468 will always be actuated when the phase B vehicle signal is in a "red" condition, a signal is fed to terminal 472 from the output of OR gate 292 which determines the phase B vehicle "red" condition (FIG. 7). Re-set signals are fed with each operation from the output of OR gate 441 to line 110 of the extension timer to effect the re-setting of the counters of this timer (FIG. 4).

If so desired, the traffic control system can be caused to operate in fully programmed type of operation, cycling back and forth between the streets in a pre-determined timing sequence, regardless of the traffic conditions. Such operation can be achieved merely by closing switch 402 in the phase B pedestrian control (FIG. 8), and switch 266 in the phase B memory (FIG. 9). Under such conditions a continuous call signal appears at terminal 130 of phase A control (FIG. 6), so that as soon as the cycling sequence has been completed it will be automatically re-initiated. To return to the semi-actuated operation, all that need be done is that these two switches be opened.

Referring now to FIG. 10, a schematic diagram of one of the timing selector switches and gates 70 of the main timer is illustrated. A similar type of mechanism may be utilized for timing selector switches and gates 89 of the extension timer. The outputs of each of the stages of the first ring counter are fed to an associated one of switch contacts 480a of rotary switch 480, while the outputs of each of the stages of the second ring counter are fed to an associated one of contacts 481a of rotary switch 481. The particular timing interval desired is selected by means of selector arms 480b and 481b. Switch arms 480b and 481b are connected to AND gate 483. When signals are simultaneously received by AND gate 483 from switch arm 480b and switch arm 481b, the AND gate is driven to the TRUE condition and a timing signal appears at the output thereof. Such simultaneous inputs to AND gate 483 will only appear when the selected timing sequence has been completed. Thus, if we assume that the first ring counter produces outputs from its various stages at one second intervals in sequence, and the second ring counter produces outputs from its various stages sequentially at ten second intervals, then the selector switches 480 and 481 are set as shown in FIG. 10 to produce a timing signal at a 44-second interval, arm 480b being set at the fifth terminal connected to the fifth stage of the first ring counter representing a 4-second timing interval, and arm 481b being connected to the fifth terminal corresponding to the fifth stage or a 40-second timing interval of the second ring counter. Thus, utilizing a plurality of similar pairs of selector switches in conjunction with an AND gate, the output of the ring counters can be utilized to produce a variety of timing signals.

The system of this invention thus provides a highly accurate and versatile traffic controller, which lends itself to compact construction and is readily adaptable to various modes of operation. By utilizing digital techniques and logical control circuitry, semiconductor units can be utilized throughout thereby affording the inherent advantages of this type of circuitry.

While the system of the invention has been described and illustrated in detail, it is to be clearly understood that this is intended by way of illustration and example only and is not to be taken by way of limitation, the spirit and scope of this invention being limited only by the terms of the following claims.

We claim:

1. In a traffic control system for controlling a traffic signal including a plurality of traffic lights,
   a power source,
   switch means for selectively connecting power to said lights,
   clock generator means for generating accurate clock pulses,
   timer means responsive to said clock pulses for generating a plurality of timing signals at preselected time intervals, said timer means comprising counter means for counting said clock pulses and selector switch means for selecting various predetermined outputs of said counter means, and
   control means for actuating said switch means to energize said lights in accordance with a predetermined program, said control means operating in response to said timing signals.

2. The system as recited in claim 1 wherein said power source comprises a frequency regulated source of alternating current, said clock generator means being synchronously driven by the output of said power source.

3. The system as recited in claim 1 wherein said control means includes a plurality of logical gating circuits, sequencer means for controlling the sequence of operation of said logical gating circuits and traffic actuator means responsive to actuation by traffic for initiating a predetermined sequence of operation of said logical gating circuits, the outputs of said gating circuits operating to actuate said switch means.

4. The system as recited in claim 3 wherein a first group of said logical gating circuits operate to control an actuated phase of traffic control operation and a second group of logical gating circuits operate to control a non-actuated phase of traffic control operation, said traffic actuator means operating to initiate said actuated phase of operation.

5. The system as defined in claim 4 wherein said first group of said logical gating circuits includes memory means for reinitiating the timing cycle of at least one of said sequences of operation in response to said traffic actuator means.

6. In a traffic control system for controlling a plurality of traffic lights,
   a power source,
   switch means interposed between said power source and said traffic lights for selectively connecting power to said lights,
   clock generator means for generating clock pulses,
   timer means responsive to said clock pulses for generating a plurality of timing signals at preselected time intervals, said timer means comprising counter means for counting said clock pulses and selector switch means for selecting various predetermined outputs of said counter means,
   logical gating control means for actuating said switch means to energize predetermined ones of said lights, said logical gating control means operating in response to said timing signals, and
   sequencer means for controlling the sequence of actuation of said lights in response to said logical gating control means, the sequencing of said sequencer means being advanced in response to keying signals received from said logical gating control means.

7. The system as recited in claim 6 wherein said power source comprises a frequency regulated source of alternating current, said clock generator means being synchronously driven by the output of said power source.

8. The system as recited in claim 6 wherein said logical gating control means comprises a plurality of AND and OR gates for selectively generating output signals indicative of predetermined operating conditions.

9. The system as recited in claim 6 wherein said sequencer means comprises a ring counter connected to receive pulses from said control means indicative of an advance in the sequence of operation thereof, the output of said counter being connected to said control means to indicate the succeeding sequence of operation.

10. The system as recited in claim 6 wherein said logical gating control means includes a first group of logical gating circuits operating to control an actuated phase of traffic control operation and a second group of logical gating circuits operating to control a non-actuated phase of traffic control operation.

11. A traffic control system comprising:

a first set of traffic signals for controlling traffic at an intersection on a first street, a second set of traffic signals for controlling traffic at said intersection on a second street, a power source, switch means interposed between said power source and said traffic signals for providing selective energization of said signals by said power source, and means for controlling said switch means comprising clock generator means for generating precisely timed clock pulses, timer means responsively connected to said clock generator means for generating timing signals at preselected time intervals, said timer means comprising counter means for counting said clock pulses and selector switch means for selecting various predetermined outputs of said counter means, first and second logical gating control means responsive to said timing signals for causing said switch means to selectively connect said power source to predetermined ones of said first and second sets of said signals respectively in accordance with said timing signals and other predetermined inputs, and sequencer means connected to said logical gating control means for alternatively activating said first or second control means and for controlling the sequence of operation of said signals by said logical gating control, the sequence advance of said sequencer means occurring in response to keying signals received by said sequencer means from said first and second logical gating control means.

12. The system as recited in claim 11 wherein said power source comprises a frequency controlled AC generator, said clock generator being synchronously locked with the output of said AC generator.

13. The system as recited in claim 11 wherein said first control means is adapted to control a non-actuated phase of operation and said second control means is adapted to control an actuated phase of operation, and further including traffic actuator means for providing actuation signals to said second control means in accordance with traffic conditions on said second sheet.

14. The system as recited in claim 11 wherein said second control means includes memory means operating in response to said traffic actuator means for reinitiating the generation of predetermined ones of said timing signals.

15. The system as recited in claim 11 wherein said logical gating control means comprises a plurality of AND and OR gates for selectively generating output signals indicative of predetermined operating conditions.

References Cited

UNITED STATES PATENTS

| | | | |
|---|---|---|---|
| 3,090,032 | 5/1963 | Shand | 340—35 |
| 3,281,782 | 10/1966 | Frielinghaus | 340—37 |

THOMAS B. HABECKER, *Primary Examiner.*